United States Patent
Brouwer et al.

(10) Patent No.: US 7,330,464 B2
(45) Date of Patent: Feb. 12, 2008

(54) LOCATION IDENTIFICATION FOR IP TELEPHONY TO SUPPORT EMERGENCY SERVICES

(75) Inventors: Wim L. Brouwer, North Aurora, IL (US); Antony Thomas, Burr Ridge, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 1053 days.

(21) Appl. No.: 10/461,161

(22) Filed: Jun. 13, 2003

(65) Prior Publication Data

US 2004/0057425 A1 Mar. 25, 2004

(51) Int. Cl.
*H04L 12/66* (2006.01)

(52) U.S. Cl. .......................... 370/352; 379/45

(58) Field of Classification Search ................ 370/352; 379/45, 37
See application file for complete search history.

(56) References Cited

U.S. PATENT DOCUMENTS 6,650,901 B1* 11/2003 Schuster et al. .............. 379/45
2003/0063714 A1* 4/2003 Stumer et al. ................ 379/45

* cited by examiner

*Primary Examiner*—Stella Woo

(57) ABSTRACT

A secondary directory telephone number (SDN) is assigned either to each voice over IP (VOIP) IP port utilized by subscribers or to each public safety access point (PSAP). The SDN, MAC address of the IP port accessed by a subscriber, and geographic location of the SDN or MAC address are stored in a database. This information is accessed by the PSAP based on SDN or MAC address to obtain the location of a VOIP subscriber to facilitate providing emergency services in response to a 911 call by a VOIP subscriber.

13 Claims, 3 Drawing Sheets

LOCATION IDENTIFICATION FOR IP TELEPHONY TO SUPPORT EMERGENCY SERVICES

BACKGROUND

The present invention is directed to providing emergency "911" services for Internet protocol (IP) telephones, and is more specifically directed to resolving the location of IP telephones in order to provide emergency services in response to a 911 call.

Emergency services are available in the United States by dialing "911" from a conventional wireline telephone. Such calls are routed to a public safety answering point (PSAP) based on the telephone number of the calling party which is available by calling line identification (CLI). The telephone number of the calling party is used to determine the appropriate PSAP, normally the closest PSAP to the calling party, to receive the emergency call. An automatic location identifier (ALI) database in the public switched telephone network (PSTN) contains records that associate telephone numbers to geographic locations.

The availability of 911 emergency services is complicated by the growing popularity of IP telephones. Because an IP telephone can be moved by the user to any available IP port maintained by the provider of IP telephony services subscribed to by the user, the directory number (DN) assigned to an IP telephone cannot be assumed to correspond with a specific location of the user. For example, an employee normally uses his IP phone in a home office in Chicago but elects to take the IP phone to a remote office in New York City that also supports IP telephony services for the company. The telephone number of the IP phone does not change when it is used in New York City by the employee. Hence, the telephone numbers of IP phones cannot be relied upon to determine the current location of the user.

It is important to be able to automatically determine the geographic location of the user associated with a 911 call since the user may become incapacitated or otherwise not available to provide location information to a 911 operator. Thus, there exists a need to be able to determine the geographic location of IP telephone users requesting emergency 911 services.

SUMMARY OF THE INVENTION

It is an object of the present invention to provide a solution to this problem.

In accordance with an embodiment of the present invention, a secondary directory telephone number (SDN) is assigned to each IP port that is enabled for voice over IP (VOIP). A database contains a record of each SDN and its fixed Media Access Control (MAC) address. Upon initial registration of an IP telephone at a supported port, the supporting telecommunication switch stores the SDN as well as the DN for the IP telephone. Upon a 911 call from the IP telephone, the switch retrieves the corresponding SDN and uses the SDN to determine the PSAP to route the call for handling since geographic location is associated with the SDN, i.e. the physical location of the port and not the specific IP phone utilizing the port. The SDN, and preferably the DN, are provided to the PSAP. The PSAP uses the SDN to query a database to retrieve corresponding location information of the subscriber requesting emergency services.

In accordance with another embodiment of the present invention, an SDN is assigned for each PSAP, and one of the SDNs is assigned to each IP port. Thus, multiple MAC addresses corresponding to different IP ports can be assigned the same SDN that will be used to route the emergency 911 calls to the specific PSAP associated with the single SDN. Upon initial registration of an IP phone at a supported port, the supporting telecommunication switch will store the SDN, MAC address, and DN for the IP user. Upon a 911 call from the IP phone, the switch retrieves the corresponding SDN based on DN or IP address and uses the SDN to determine the associated PSAP to receive the call. The MAC address and DN are provided to the PSAP. The PSAP retrieves the specific location of the IP telephone from a database by sending a query based on the MAC address since the SDNs are not location specific in this embodiment. Advantageously this embodiment does not require a different SDN to be assigned to each IP port, and thus minimizes the number of additional telephone numbers required to be assigned.

DETAILED DESCRIPTION

Figure 1:
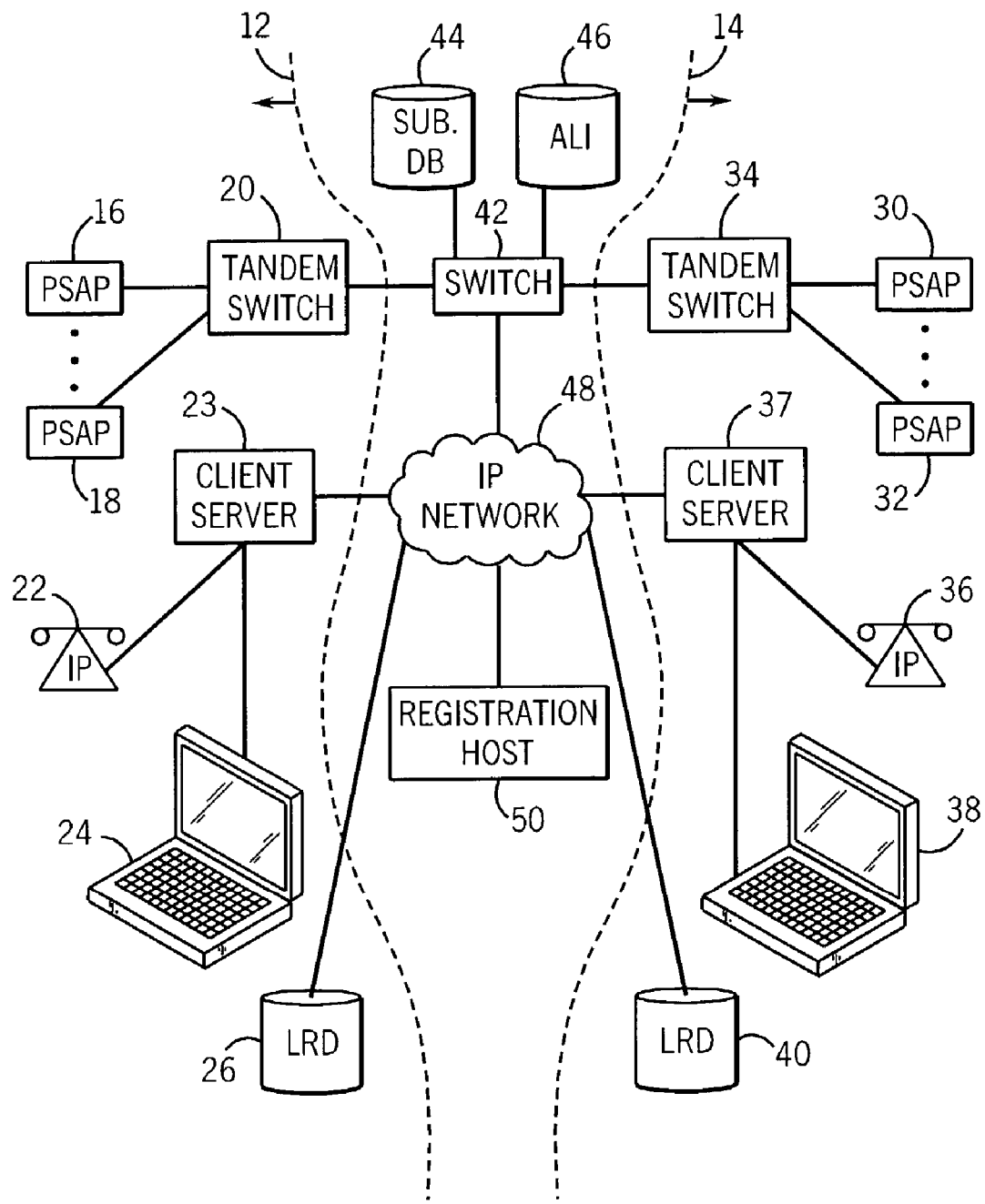
FIG. 1 is a block diagram of an exemplary telephony network suited for supporting an embodiment of the present invention.

FIG. 1 illustrates a telecommunications system 10 in which the arrows pointing from dashed lines 12 and 14 indicate different geographic regions such as Chicago and New York City, respectively. In the geographic region represented by line 12, a plurality of PSAPs represented by PSAP 16 and 18 are supported by a tandem switch 20 that supports the routing of 911 emergency calls to one of the PSAPs. An IP telephone 22 is connected to an IP port enabled for VOIP of client server 23, e.g. a hub or Ethernet switch. A laptop computer 24 is also enabled to support VOIP and is connected to a port of client server 23 with VOIP capability. A location resolution database (LRD) 26 stores information relating to SDNs and the corresponding fixed MAC addresses of the VOIP enabled ports.

In the geographic region represented by line 14, the illustrated telecommunication elements are identical to those shown in geographic region 12. The PSAPs 30 and 32 are supported by tandem switch 34 that supports the route routing of 911 emergency calls to one of the PSAPs. An IP telephone 36 is connected to an IP port enabled for VOIP of client server 37. A laptop computer 38, also enabled to support VOIP, is supported by a VOIP capable port of client server 37. A LRD 40 stores information relating to SDNs and the corresponding MAC addresses of the VOIP enabled ports. As used herein an "IP telephone" is intended to encompass all devices that support VOIP.

A telecommunication switch 42 capable of supporting VOIP is connected to tandem switches 20 and 34, a subscriber database 44, and automatic location identifier (ALI) database 46. The switch 42 is also connected to the IP network, e.g. the internet, 48 that serves as a communication backbone to transport VOIP traffic between switch 42 and exemplary VOIP users 22, 24, 36 and 38 via client servers 23 and 37. Communications between switch 42 and the exemplary LRDs 26 and 40 are also carried via Internet 48. Registration host 50 is connected to the internet 48 and serves as a centralized node for authenticating and registering valid VOIP users. Typically registration host 50 will serve a community of users such as employees of a company. Although elements 42, 44, 46 and 50 are shown as being in a geographic region outside of regions 12 and 14, it will be apparent to those skilled in the art that these elements could also be located within either region 12 or 14.

First Embodiment: SDN Assigned for Each VOIP Port

In this exemplary method an IP subscriber is a member of a company with his office in region 12, e.g. Chicago. The subscriber is on a business trip at a company office in region 14, e.g. New York City, and has carried his laptop computer 38 that is VOIP enabled. The enterprise network administrator has assigned an SDN for each VOIP enabled port, and caused this information along with the corresponding MAC address for each VOIP enabled port to be stored in LRD 26. This information along with location information for each VOIP enabled IP port is also stored in the ALI database 46.

Figure 2:
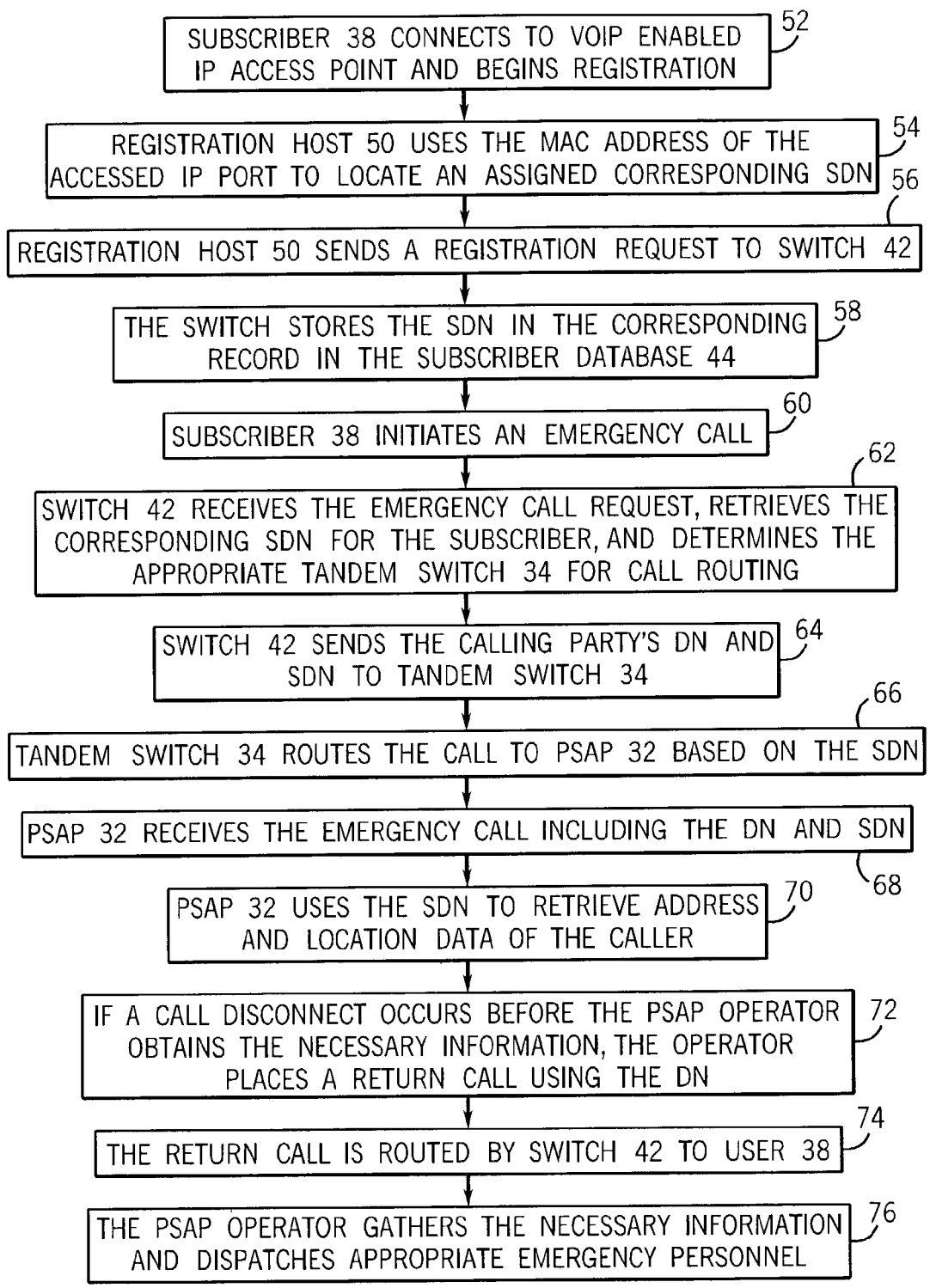
FIG. 2 is a flow diagram illustrating an exemplary method in accordance with the present invention.

As shown in FIG. 2, the subscriber connects his laptop computer 38 to a VOIP enabled IP access port supported by client server 37 to initiate registration in order to receive VOIP services at step 52. In step 54 the registration host 50 receives a first registration request and uses the received MAC address of the accessed IP port to locate an assigned corresponding SDN. This involves the registration host transmitting a query based on the MAC address of the IP port to the LRD 26 that contains the corresponding record. Where multiple or distributed LRDs are used in the network, the registration host can either determine which LRD to query, e.g. based on the DN and/or MAC address, or send a query to each LRD and await the LRD with the record to respond with the appropriate information. The LRD 26 locates the record corresponding to the IP MAC address and transmits the corresponding SDN in response to the query. In step 56 the registration host 50 sends a second registration request to switch 42; the second registration request includes the DN and SDN of the subscriber requesting service. The switch 42 locates the corresponding record in subscriber database 44 based on DN and stores the SDN in step 58.

In step 60 the subscriber 38 initiates an emergency request using VOIP supported by his laptop computer by dialing 911. In step 62 switch 42 receives the emergency call request including the DN of the calling party, retrieves the corresponding SDN for the subscriber from the subscriber database 44, and determines that the tandem switch 34 is the appropriate tandem switch for call routing. The switch 42 sends the calling party's DN and SDN to tandem switch 34 in step 64. In step 66 the tandem switch 34 routes the call to PSAP 32 based on the SDN. In step 68 PSAP 32 receives the emergency call request that includes the calling party's DN and SDN. The PSAP 32 uses the SDN to retrieve address and location data of the caller from ALI database 46 in step 70. Since the SDN is unique and has a corresponding MAC address stored in the ALI database during registration, location can be determined based on the fixed MAC address for the port in use by the calling party, or alternatively location information can be stored in the ALI for direct retrieval. If a call disconnect occurs before the PSAP operator obtained the necessary information from a conversation with the calling party, the operator places a return call using the calling party's DN in step 72. The return call is routed by switch 42 to the calling party 38 in step 74. The PSAP operator gathers the necessary information from the calling party and dispatches appropriate emergency personnel in step 76.

It will be apparent that steps 72, 74 and 76 will not be required if the PSAP operator obtains the necessary information from the calling party without a call disconnect occurring. Alternatively, the operator can dispatch a default emergency team if a conversation with the calling party is not possible, e.g. calling party is unable to speak or speaks a language not understood by the operator. These additional steps are shown to illustrate the ability of a PSAP operator to initiate a return call based on the DN of the calling party even though the SDN associated with the calling party was utilized to identify the appropriate PSAP to handle the call. This embodiment does not require any changes to the ALI database.

Second Embodiment: SDN Assigned for Each PSAP

Similar to the first embodiment an IP subscriber is a member of a company with his office in region 12, e.g. Chicago. The subscriber is on a business trip at a company office in region 14, e.g. New York City, and has carried his laptop computer 38 that is VOIP enabled. However, in this embodiment the enterprise network administrator has assigned an SDN for each PSAP instead of assigning a different SDN for each VOIP port. The assigned SDN and MAC address for each VOIP port are stored in LRD 26. This information along with location information for each VOIP enabled IP port is also stored in the ALI database 46.

Figure 3:
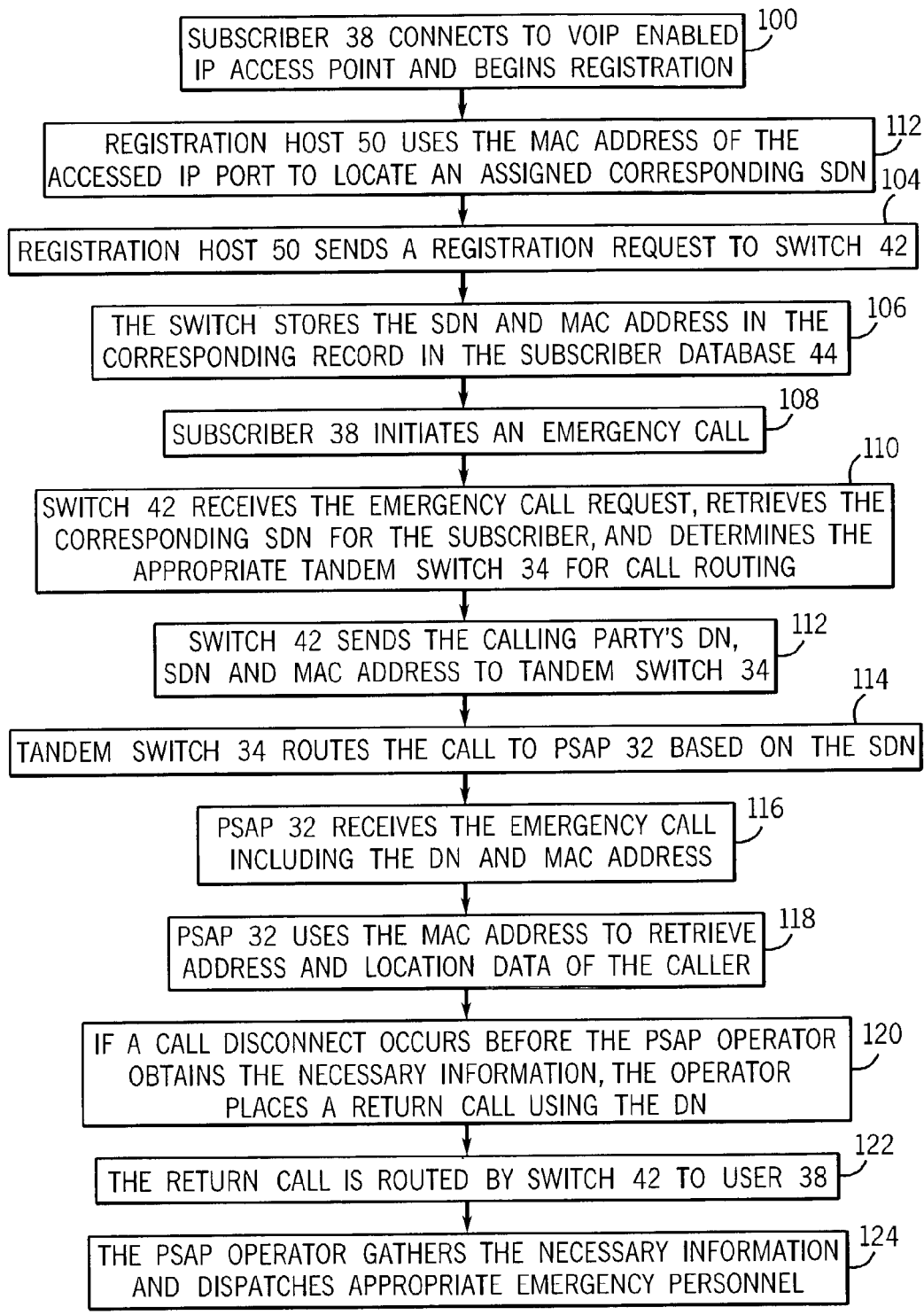
FIG. 3 is a flow diagram illustrating another exemplary method in accordance with the present invention.

As shown in FIG. 3, the subscriber connects his laptop computer 38 to a VOIP enabled IP access point supported by client server 37 to initiate registration in order to receive VOIP services at step 100. In step 104 the registration host 50 receives a first registration request and uses the received MAC address of the accessed IP port to locate an assigned SDN. This involves the registration host transmitting a query based on the MAC address of the IP port to the LRD 26 that contains the corresponding record. Where multiple or distributed LRDs are used in the network, the registration host can either determine which LRD to query, e.g. based on the DN and/or MAC address, or send a query to each LRD and await the LRD with the record to respond with the appropriate information. The LRD 26 locates the record corresponding to the IP MAC address and transmits the corresponding SDN in response to the query. In step 104 the registration host 50 sends a second registration request to switch 42; the second registration request includes the DN, MAC address and SDN of the subscriber requesting service. The switch 42 locates the corresponding record in subscriber database 44 based on DN and stores the SDN in step 106.

In step 108 the subscriber 38 initiates an emergency request for services using VOIP supported by his laptop computer by dialing 911. In step 110 switch 42 receives the emergency call request, retrieves the corresponding SDN for the subscriber from the subscriber database 44 based on the DN or IP address, and determines that the tandem switch 34 is the appropriate tandem switch for call routing. The switch 42 sends the calling party's DN, SDN and MAC address to tandem switch 34 in step 112. In step 114 the tandem switch 34 routes the call to PSAP 32 based on the SDN. In step 116 PSAP 32 receives the emergency 911 call that includes the calling party's DN and MAC address. The PSAP 32 uses the MAC address to retrieve the location of the caller from ALI database 46 in step 118. Location can be determined based on the unique MAC address for the port in use by the calling party since location information is stored in the ALI database for each MAC address by the system administrator. If a call disconnect occurs before the PSAP operator obtained the necessary information from a conversation with the calling party, the operator places a return call using the calling party's DN in step 120. The return call is routed by switch 42 to the calling party 38 in step 122. The PSAP operator gathers the necessary information from the calling party and dispatches appropriate emergency personnel in step 124.

It will be apparent that steps 120, 122 and 124 will not be required if the PSAP operator obtains the necessary information from the calling party without a called disconnect occurring. These additional steps are shown to illustrate the ability of a PSAP operator to initiate a return call based on the DN of the calling party even though the SDN associated with the calling party was utilized to identify the appropriate PSAP to handle the call.

In accordance with embodiments of the present invention, the registration procedure for the registration host and the switch will need to accommodate SDN and MAC address information as well as having the ability to query the LRD database. The registration message format will accommodate the transmission of SDN and MAC address information. The ALI database will need to accommodate records that include SDN and MAC addresses, as well as permitting records to be accessed based on queries for this information.

Various modifications of the embodiments as described above and shown in the drawings can be made by those skilled in the art without departing from the scope of the present invention. Depending on the capacity and intelligence associated with nodes as shown in FIG. 1, separate elements can be combined into a single node. The different geographic regions shown in FIG. 1 are intended to aid in understanding implementations in which IP users may elect to connect VOIP enabled devices at IP ports other than a normal home port including ports that are geographical remote from the home port. Of course, the embodiments of the present invention also perform the desired functions if the subscriber is located at his home port. Depending upon the nodes available and desired network architecture, information can be stored in a central database or distributed among a variety of databases located throughout the network. Although only a single switch is utilized in the illustrative embodiment, it will be apparent that a plurality of switches may be utilized depending upon the size and capacity of the network to be supported. A variety of VOIP enabled devices including wireline and wireless devices can be utilized.

Although embodiments of the present invention have been described above and shown in the drawings, the scope of the invention is defined by the claims that follow.

We claim:

1. A method for supporting emergency services provided by public safety access points (PSAPs) by locating a telephony subscriber that is using voice over internet protocol (VOIP) services in a telephone network, the method comprising the steps of:

assigning a unique secondary telephone directory number (SDN) to each VOIP access port in addition to a telephone directory number;

storing in a database for each VOIP access port a corresponding SDN and geographic location information;

receiving a first request for emergency services where said first request includes identification of one SDN assigned to the VOIP access port from which the corresponding request for emergency services originated;

determining, based on said one SDN, one PSAP to handle the first request for emergency services;

transmitting to the one PSAP a second request based on the first request, the second request including the directory number of the requesting subscriber and the one SDN;

the one PSAP generating a query to the database to obtain the corresponding geographic location information associated with the one SDN;

the one PSAP receiving a reply to the query containing the geographic location information associated with the one SDN, thereby identifying the location of the requesting subscriber.

2. The method according to claim 1 further comprising registering by the subscriber as a user of the network including determining the SDN of the subscriber's VOW access port based on MAC address of the VOIP access port.

3. The method according to claim 2 further comprising storing the SDN of the registering subscriber in a record associated with the registering subscriber in a subscriber database accessible by a telecommunication switch to handle calls made by the subscriber.

4. The method according to claim 1 wherein the step of receiving the first request includes receiving dialed digits 911 by the subscriber.

5. The method according to claim 1 wherein the step of receiving comprises receiving the first request for emergency services by a public switched telephone network switch which determines, based on said one SDN, the one PSAP to handle the first request for emergency services.

6. A method implemented by a public safety access point (PSAP) for supporting emergency services provided by locating a telephony subscriber that is using voice over internet protocol (VOIP) services in a telephone network, the method comprising the steps of:

receiving a request for emergency services, the request including a directory number and a secondary directory number (SDN) of a subscriber seeking emergency services from a VOIP access port, the SDN being a unique number assigned to said VOIP access port;

generating a query to a database that contains geographic location information corresponding to SDNs;

receiving a reply to the query containing the geographic location information associated with the SDN of the subscriber seeking emergency services, thereby identifying the location of the requesting subscriber so that emergency assistance can be dispatched by an operator of the PSAP.

7. The method according to claim 6 wherein the step of receiving a request includes receiving dialed digits 911 by the subscriber.

8. The method according to claim 6 wherein the step of receiving comprises receiving the request for emergency services by a public switched telephone network switch which determines, based on said SDN, the one PSAP to handle the first request for emergency services.

9. A method for supporting emergency services provided by public safety access points (PSAPs) by locating a telephony subscriber that is using voice over internet protocol (VOIP) services in a telephone network, the method comprising the steps of:

assigning a unique secondary telephone directory number (SDN) to each PSAP;

storing in a database a SDN and geographic location information corresponding to each VOIP access port MAC address;

receiving a first request for emergency services where said first request includes the VOIP access port MAC address from which the corresponding request for emergency services originated;

determining, based on said received VOIP access port MAC address, one PSAP to handle the first request for emergency services;

transmitting to the one PSAP a second request based on the first request, the second request including the directory number of the requesting subscriber and the VOIP access port MAC address;

the one PSAP generating a query to the database to obtain the corresponding geographic location information associated with the VOIP access port MAC address;

the one PSAP receiving a reply to the query containing the geographic location information associated with the one SDN, thereby identifying the location of the requesting subscriber.

10. The method according to claim 9 further comprising registering by the subscriber as a user of the network including determining the SDN of the subscriber's VOIP access port based on MAC address of the VOIP access port.

11. The method according to claim 10 further comprising storing the SDN of the registering subscriber in a record associated with the registering subscriber in a subscriber database accessible by a telecommunication switch to handle calls made by the subscriber.

12. The method according to claim 9 wherein the step of receiving the first request includes receiving dialed digits 911 by the subscriber.

13. The method according to claim 9 wherein the step of receiving comprises receiving the first request for emergency services by a public switched telephone network switch which determines, based on said received VOIP access port MAC address, one PSAP to handle the first request for emergency services.

* * * * *